United States Patent [19]
Shido et al.

[11] Patent Number: 6,072,764
[45] Date of Patent: Jun. 6, 2000

[54] INFORMATION PROCESSING APPARATUS HAVING FACE REGULATING SYSTEM

[75] Inventors: Shunichi Shido, Zama; Takayuki Yagi, Yokohama, both of Japan

[73] Assignee: Canon Kabushiki Kaisha, Tokyo, Japan

[21] Appl. No.: 09/076,630

[22] Filed: May 12, 1998

[30] Foreign Application Priority Data

May 13, 1997 [JP] Japan ................................. 9-137761

[51] Int. Cl.⁷ .................................................. G11B 7/00
[52] U.S. Cl. ............................................................ 369/126
[58] Field of Search ................................. 369/126, 101; 250/306, 305

[56] References Cited

U.S. PATENT DOCUMENTS

| | | | |
|---|---|---|---|
| 5,260,567 | 11/1993 | Kuroda et al. | 250/227.19 |
| 5,299,184 | 3/1994 | Yamano et al. | 369/44.28 |
| 5,317,152 | 5/1994 | Takamatsu et al. | 250/306 |
| 5,329,122 | 7/1994 | Sakai et al. | 250/306 |
| 5,357,108 | 10/1994 | Suzuki et al. | 250/306 |
| 5,371,727 | 12/1994 | Shido et al. | 369/124 |
| 5,485,451 | 1/1996 | Yamano et al. | 369/126 |
| 5,526,334 | 6/1996 | Yamano et al. | 369/53 |
| 5,535,018 | 7/1996 | Yamano et al. | 358/444 |
| 5,554,851 | 9/1996 | Hirai et al. | 250/442.11 |
| 5,658,698 | 8/1997 | Yagi et al. | 430/11 |
| 5,717,680 | 2/1998 | Yamano et al. | 369/126 |

FOREIGN PATENT DOCUMENTS

| | | |
|---|---|---|
| 63-161552 | 7/1988 | Japan . |
| 63-161553 | 7/1988 | Japan . |
| 5-196458 | 8/1993 | Japan . |

OTHER PUBLICATIONS

M. Tortonese, et al., "Atomic Resolution with an Atomic Force Microscope Using Piezoresistive Detection," Appl. Phys. Lett., vol. 62, p. 834 (1993).

*Primary Examiner*—Nabil Hindi
*Attorney, Agent, or Firm*—Fitzpatrick, Cella, Harper & Scinto

[57] ABSTRACT

An information processing apparatus is used for recording and/or reproducing information on a recording medium by means of a plurality of probes. The apparatus comprises a substrate carrying thereon a plurality of probes arranged two-dimensionally in a plane, at least three sensors at three different points on the substrate for detecting the distance between the substrate and the recording medium, a switching circuit for selecting a parallel connection or a serial connection for the sensors, and a regulating system for regulating the relative inclination and the distance between the probe plane and the recording medium surface plane according to the output of the sensors connected in series and that of the sensors connected in parallel.

5 Claims, 12 Drawing Sheets

INFORMATION PROCESSING APPARATUS HAVING FACE REGULATING SYSTEM

BACKGROUND OF THE INVENTION

1. Field of the Invention

This invention relates to an apparatus for recording/reproducing information by utilizing certain electric phenomena that occur when a voltage is applied between a probe and a medium to make them approach each other. More particularly, it relates to an information processing apparatus for recording/reproducing information by measuring the electric current running between a probe and a medium and detecting changes in the electric current signal.

2. Related Background Art

As a result of the development of scanning probe microscope (hereinafter referred to as SPM) that allows the user to directly observe the surface of an object or the electronic structure near the surface of an object by making a probe and the object approach each other and utilizing certain physical phenomena (a tunneling phenomenon, an atomic force, etc.) that occur between them, it is now possible to directly observe various physical volumes with an enhanced level of resolution for a real space image regardless if the volume is monocrystalline or noncrystalline.

From the industrial point of view, efforts have been paid for developing novel information recording/reproducing apparatus, using a recording medium in the form a layer as such an object and exploiting the high resolution of the SPM adapted to observe an atom or a molecule. Japanese Patent Applications Laid-Open Nos. 63-161552 and 63-161553 disclose such apparatus.

An information recording/reproducing apparatus of the type under consideration is often adapted to process a plurality of probes simultaneously (multi-processing) in order to improve the data transfer rate of the apparatus.

Thus, researches have been made for applying an existing semiconductor process to the process of preparing probes.

For example, in order to realize a data transfer speed of about 200 Mbps, a total of 2,000 probes have to be used if each probe shows a transfer speed of 100 kbps. While 2,000 probes may be produced on a same and single substrate by utilizing a known semiconductor process, they will often have to be arranged two-dimensionally on the surface of the substrate, which will be referred to as probe substrate hereinafter.

When arranging probes two-dimensionally, the medium surface and the probe substrate have to be rigorously held in parallel with each other in order to keep all the probes separated from the medium at a distance good for their mutual interaction.

The parallelism between them can be achieved by arranging three or more than three measuring systems on the probe substrate for measuring the distance between the probe substrate and the recording medium and collecting distance information from the systems.

If conventional optical lever type AFMs are used for measuring the distance at a plurality of points, each of them requires an optical detection system so that the entire arrangement of simultaneously measuring the displacements of the plurality of probes will be a very complicated one, which can be problematic particularly when the probes are to be integrally prepared.

On the other hand, the piezoresistor technology has become available for measuring a displacement of an object. With this technology, the change in the electric resistance of a semiconductor due to its strain is detected by way of the corresponding strain of a displacement detection system that typically comprises a cantilever as disclosed in Japanese Patent Application Laid-Open No. 5-196458. When such a displacement detection means is used, there is no need of employing conventional optical lever type AFMs and optical detection systems. Thus, such a means is particularly advantageous for integrally producing a plurality of displacement detection probes on a substrate because only the change in the resistance has to be detected with such a means.

SUMMARY OF THE INVENTION

In view of the above discussed problems, it is therefore the object of the present invention to provide an information processing apparatus adapted to arrange a probe plane and the surface plane of a recording medium in parallel with each other by a simple means.

According to the invention, the above object is achieved by providing an information processing apparatus for recording/reproducing information on a recording medium by means of probes comprising:

- a substrate carrying thereon a plurality of probes arranged two-dimensionally in a plane;
- at least three sensors at three different points on the substrate for detecting the distance between the substrate and the recording medium;
- a switching circuit for selecting a parallel connection or a serial connection for the sensors; and
- a regulating system for regulating the relative inclination and the distance between the probe plane and the recording medium surface plane according to the output of the sensors connected in series and that of the sensors connected in parallel.

DESCRIPTION OF THE PREFERRED EMBODIMENTS

Now, the present invention will be described by referring to the accompanying drawings that illustrate preferred embodiments of the invention.

[First Embodiment]

Figure 1A:
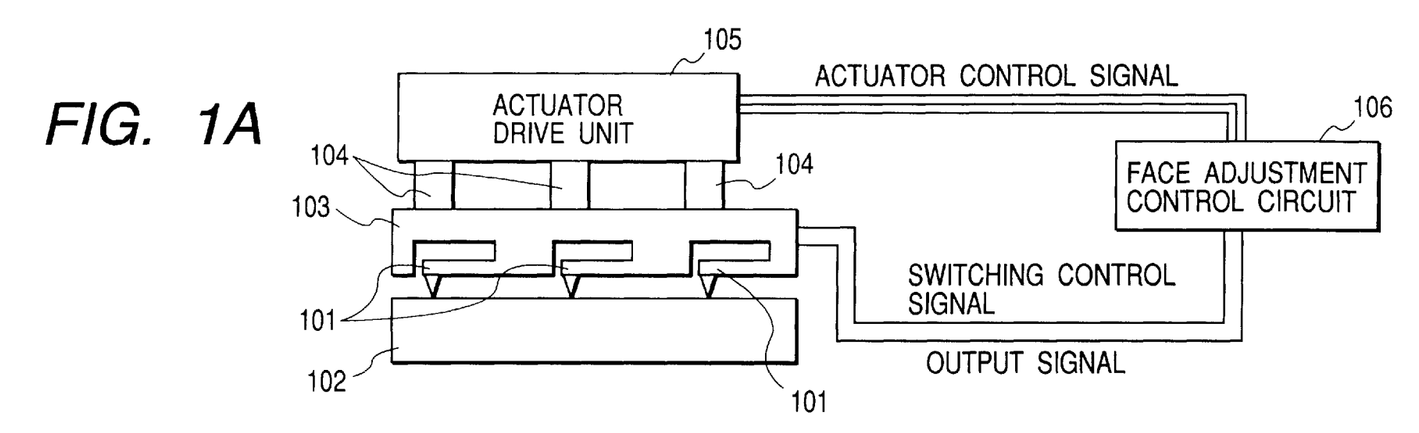
FIGS. 1A and 1B schematically illustrate the configuration of a first embodiment of face regulating system according to the invention.
Figure 1B:
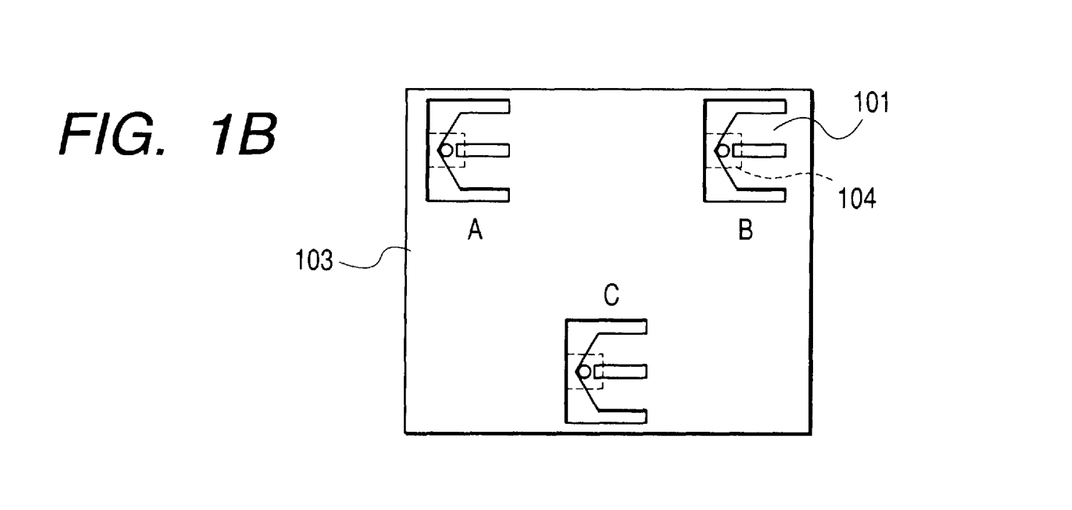

FIGS. 1A and 1B schematically illustrate the configuration of a first embodiment of face regulating system according to the invention.

FIG. 1A is a side view of the embodiment showing a recording medium 102 and a probe substrate 103 arranged in parallel with each other and the probe substrate 103 carries on the surface thereof at least three displacement detection probes 101 for detecting the distance between the recording medium 102 and the probe substrate 103.

Figure 2A:
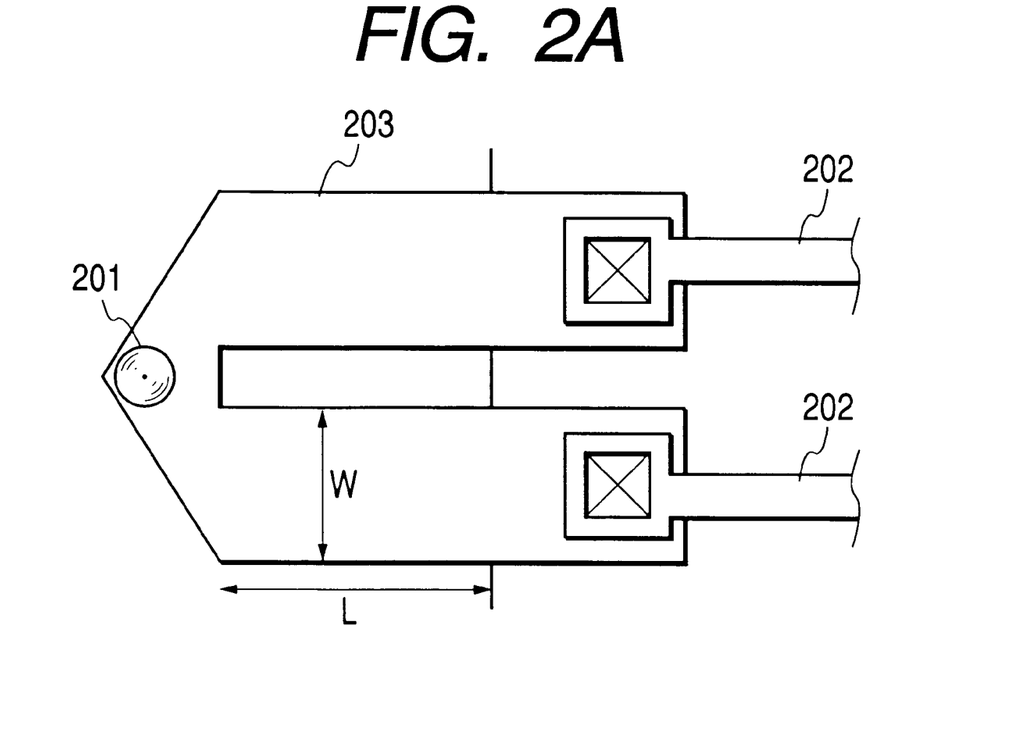
FIGS. 2A and 2B schematically illustrate a displacement detection lever that can be used for the face regulating system of FIGS. 1A and 1B.
Figure 2B:
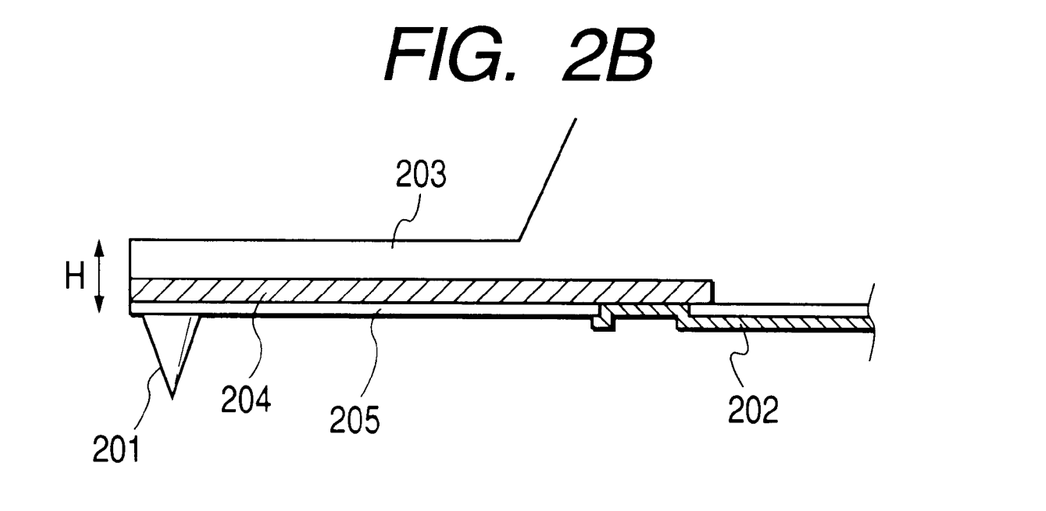

FIGS. 2A and 2B illustrate one of the probes in greater detail. FIG. 2A is a schematic plan view of the probe, which comprises a cantilever 203 having a tip 201 at the free end thereof. It will be appreciated that the probe is realized in the form of a lever including an n-type Si substrate and a p-type piezoresistor 204 as seen from FIG. 2B. In FIGS. 2A and 2B, there are also shown an insulation/protection layer 205 of a silicon oxide film and a wire 202 extending from the piezoresistor 204 and formed by aluminum evaporation to show a certain metal wiring pattern, in addition to the probe 201, the cantilever 203 and the piezoresistor 204.

Returning to FIGS. 1A and 1B, the probe substrate 103 is driven to move vertically relative to the recording plane of the recording medium by means of three actuators 104, which are by turn driven and supported by an actuator drive unit 105. The actuator drive unit 105 drives the actuators according to a control signal from a face adjustment control circuit 106.

The face adjustment control circuit 106 performs its control operation on the basis of the resistance values of the output signals sent from the probe substrate, which resistance values change according to the switching control signal sent from the face adjustment control circuit 106.

FIG. 1B is a schematic view of the probe substrate as seen from below. Note that the probes are not arranged on a single straight line so that they may define a plane. The dotted squares in FIG. 1B show the locations of the actuators 104 (which will be referred to as actuator A, actuator B and actuator C to show the correspondence to the respective probes).

Each of the probes has a configuration as schematically illustrated in FIGS. 2A and 2B, of which FIG. 2A is a plan view and FIG. 2B is a cross sectional side view. The probes can be prepared by means of a process using an SOI substrate as disclosed in Japanese Patent Application Laid-Open No. 5-196458.

As described above, there are shown a substrate and a cantilever arm 203, a piezoresistor 204, a tip 201, an insulation/protection layer 205 and a metal wiring pattern 202. Reference symbols L and W respectively denote the effective length and the effective width of the cantilever and reference symbol H denotes the height of the lever.

It will be appreciated that the mechanical characteristics (modulus of elasticity, resonant frequency, etc.) of the levers and the piezoresistance of the piezoresistors are affected by these dimensions. The probes of this embodiment have a width of W=20 $\mu$m, a length of L=50 $\mu$m and a height of H=2 $\mu$m, whereas the piezoresistors have a thickness of 0.5 $\mu$m and an initial resistance of $R_{init}$=17 k$\Omega$ (with a variance of 0.01% among the probes) before being subjected to stress. The resonant frequency of the levers is 145 kHz.

Now, the operation of the embodiment will be described by referring to FIGS. 3A, 3B and 4.

Figure 3A:
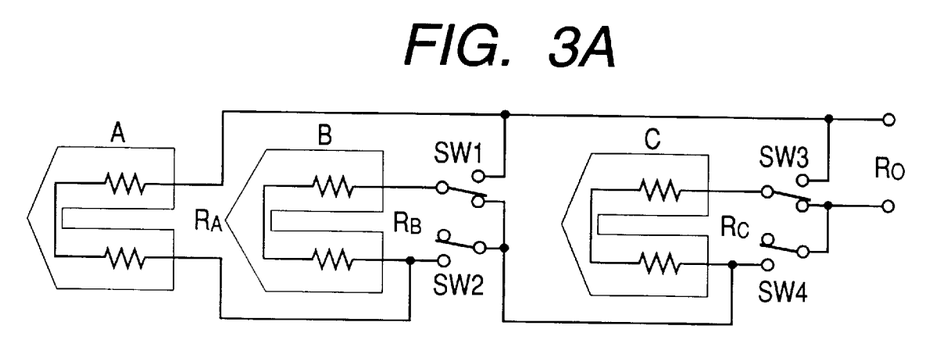
FIGS. 3A and 3B are circuit diagrams of the circuit for connecting the lever resistors of the first embodiment of the invention.

As shown in FIG. 3A, a total of four analog switches SW1 through SW4 are arranged on the substrate 103 to select the resistance of the levers. In this embodiment, a switching circuit comprising MOS-FETs is arranged on the substrate. The switches are then turned on/off according to the switching control signal sent from the face adjustment control circuit 106 as shown in FIG. 1A.

Basically, the change $\Delta R$ in the electric resistance of the lever is proportional to the deflection $\Delta Z$ of the piezoresistor lever (as described in detail in M. Tortonese, R. C. Barrett and C. F. Quate, Appl. Phys. Lett., 62, 834 (1993)), or piezoresistance $R=R_0+\Delta R=R_0+\alpha\Delta Z$. This will be described by way of the two probes A and B in FIGS. 1A and 1B.

The resistances of the probes will be expressed by $R_{A0}=R_{B0}=R_0$ when neither of the two probes are in contact with the recording medium.

As the probe substrate is brought close to the recording medium, the two probes eventually get into contact with the latter. If the deflections of the two probes under this condition are $\Delta Z_A$ and $\Delta Z_B$ respectively, equations $R_{A0}=R_0+\alpha\Delta Z_A$ and $R_{B0}=R_0+\alpha\Delta Z_B$ will be obtained.

If the surface plane of the probe substrate is completely in parallel with that of the recording medium, the deflections of the probes A and B will be equal to each other and hence they will show a same and equal electric resistance.

If $R_{A0}=R_0+\alpha\Delta Z_A=R_1+\Delta Z$ and $R_{B0}=R_0+\alpha\Delta Z_B=R_1-\Delta Z$, the two planes will be in parallel with each other when $\Delta Z=0$. Then, $R_{A0}$ and $R_{B0}$ are connected in parallel (to show a combined resistance of $R_p$) and the levers are driven to move at a same rate in opposite directions by driving the respective actuators A and B until a maximal value is obtained for $R_p$.

Since $R_p^{-1}=(R_1+\Delta Z)^{-1}+(R_1-\Delta Z)^{-1}=2R_1(R_1^2-\Delta Z^2)^{-1}$, $\Delta Z$ is equal to 0 for a maximal $R_p$. Thus, the recording medium plane and the line connecting the two probes A and B are in parallel with each other.

Figure 3B:
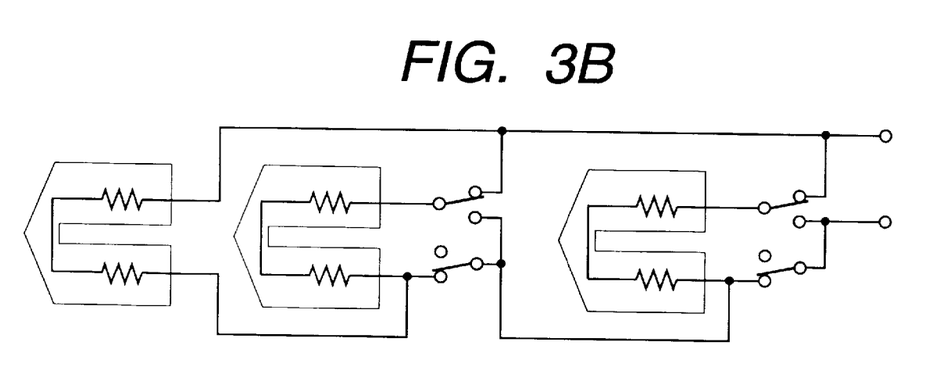

Thus, according to the invention, the surface plane of the recording medium and that of the probe substrate can be parallelized in a simple manner by means of three probes and a switching circuit as shown in FIGS. 3A and 3B (an operation referred to as face regulation or face adjustment control).

In FIG. 3A, the probes are connected in series whereas FIG. 3B shows the probes connected in parallel. According to the invention, a face regulating operation proceeds in a manner as illustrated in FIG. 4.

To begin with, the probes are connected in series (Step 1) and the actuators A, B and C are driven to move the probe substrate closer to the recording medium substrate (Step 2).

While the actuators are laminate type piezoelectric units in this embodiment, they may be replaced by those having a relatively large dynamic range such as stepping motors. While one of the probes gets into contact with the recording medium at first, the probe will show only little change in the resistance until a second probe touches the recording medium.

When second and third probes get into contact with the recording medium, the change in the resistance will be doubled and then trebled. Thus, it is possible to confirm that all the three probes have touched the recording medium by observing the change in the electric resistance.

Once all the three probes get into contact with the recording medium, the switches of the switching circuit are turned to connect the probes in parallel as shown in FIG. 3B (Step 3).

Then, a maximal value will be detected for the resistance of the circuit by moving the actuators A and B in opposite directions at a same rate, holding the actuator C stationarily (Step 4).

Then, the actuators A and B are driven in a same direction and the actuator C is driven in the opposite direction at a same rate, keeping the electric connection unchanged (FIG. 3B), to find out a maximal value for the electric resistance (Step 5).

The surface plane of the probe substrate and that of the recording medium substrate are held in parallel when the above scanning operation is over. Then, the probes A, B and C are connected in series once again and all the actuators are moved in a same direction at a same rate to obtain a selected displacement for all the probes relative to the surface plane of the recording medium (Step 7).

With the above described technique, a simplified detecting system can be used because no complicated circuits are required to monitor the resistances of the piezoresistors independently.

Figure 5:
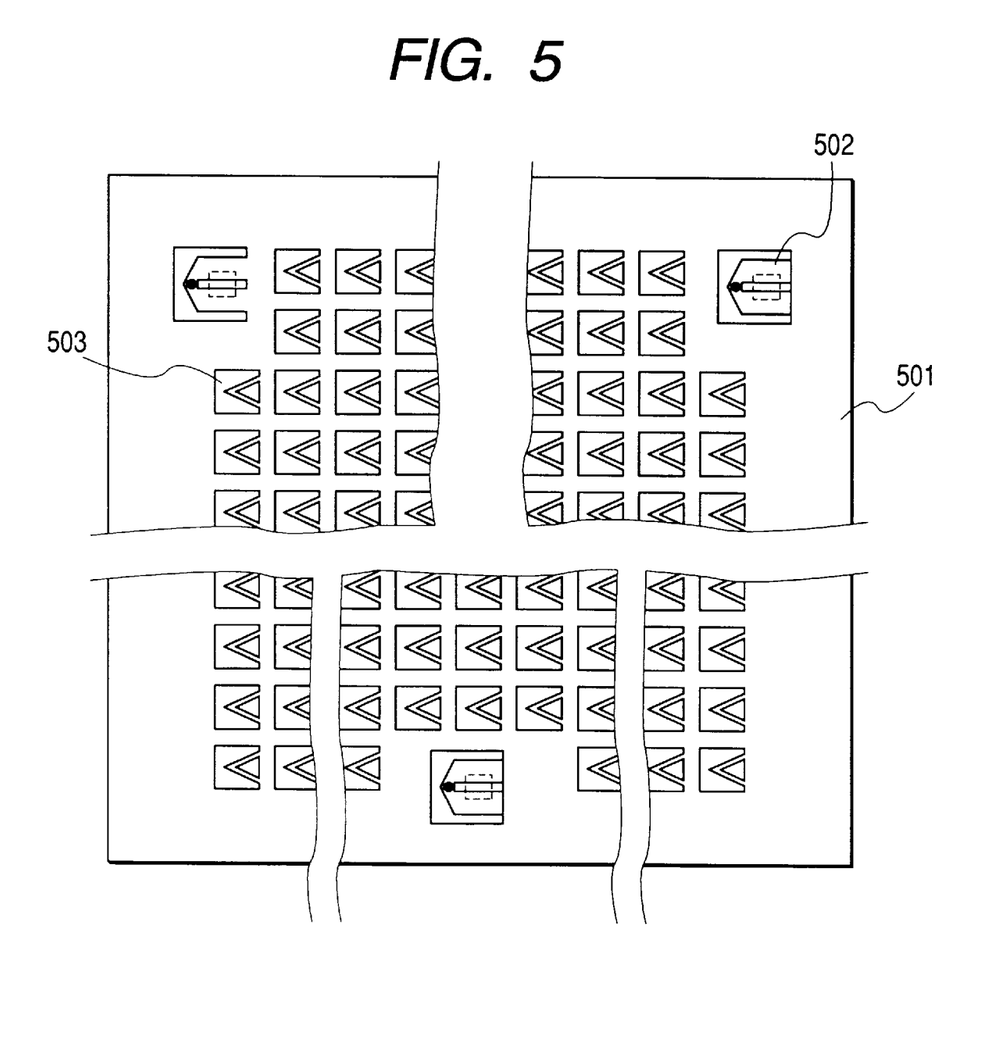
FIG. 5 is a schematic plan view of a recording/reproducing probe substrate that can be used for the first embodiment.

In an experiment, a 2 mm□ probe substrate as schematically shown in FIG. 5 was prepared to see that the face regulating operation can be conducted reliably and accurately with the above described technique.

Figure 6A:
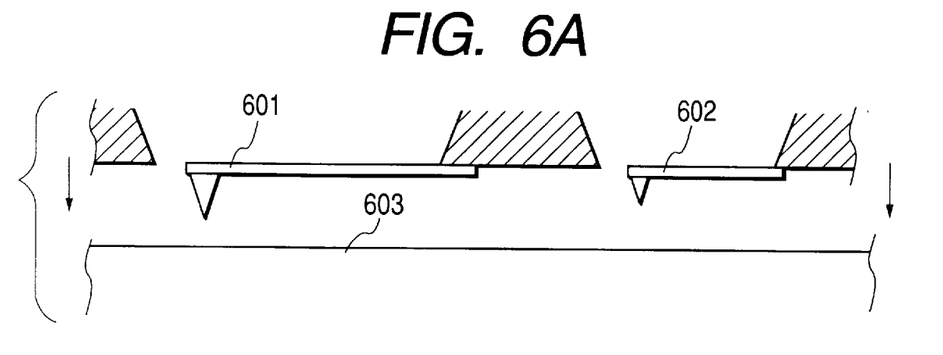
FIGS. 6A and 6B schematically illustrate the positional relationship between one of the displacement detection probes of the first embodiment and a corresponding current detection probe under two different conditions.
Figure 6B:
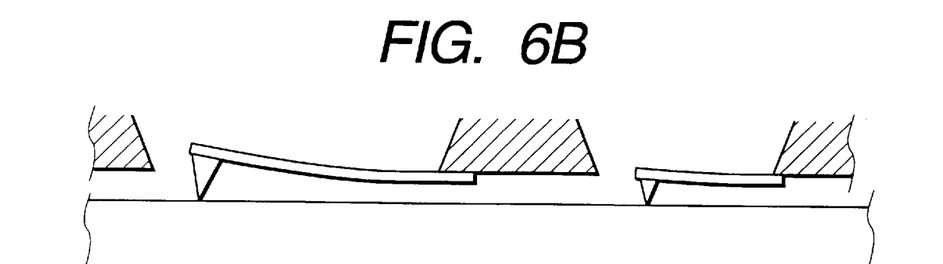

Referring to FIG. 5, the probe substrate 501 carries thereon a total of three face regulating probes 502 along with a total of 400 (20×20) current detection micro-probes 503 arranged at regular intervals. FIGS. 6A and 6B schematically illustrate the positional relationship between one of the face regulating probes and a corresponding current detection probe under two different conditions. Reference numerals 601, 602 and 603 respectively denote the face regulating probe, the current detection micro-probe and the surface plane of the recording medium.

Figure 7:
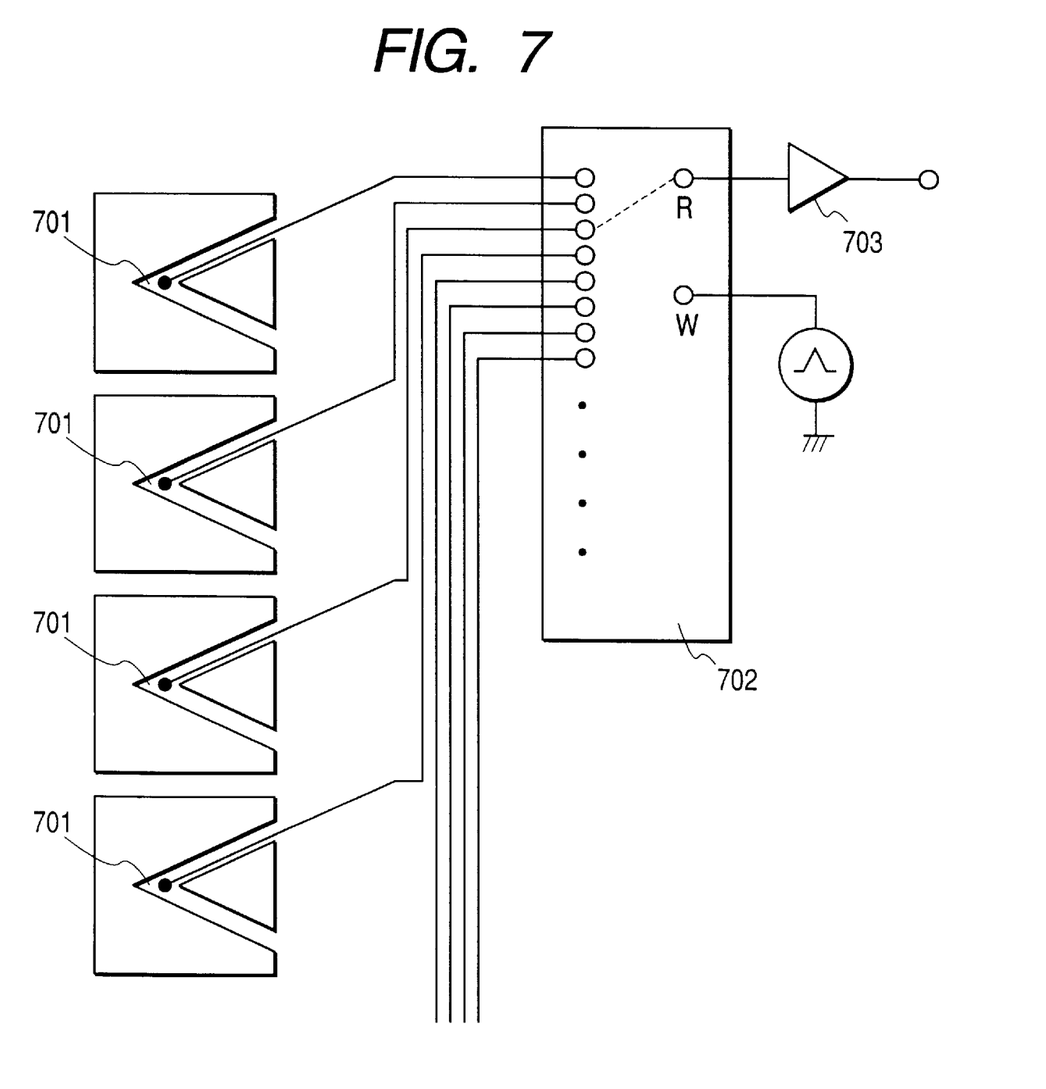
FIG. 7 is a schematic block diagram of a current detection system that can be used for the purpose of the invention.

FIG. 7 is a schematic block diagram of a current detection system that can be used for the purpose of the invention. In FIG. 7, electroconductive tips 701 are connected with respective current pick-up wires so that an electric current flows through them as they contact a recording medium having an electric potential different from that of the tips to prove the contact.

Each of the probes is used on a time-division basis. Reference numeral 702 in FIG. 7 denotes a switch. It will be seen that the R terminal is currently connected to the third probe from above.

Referring to FIG. 7, the R terminal is connected to a current/voltage conversion circuit 703 so that the detected current is measured as voltage.

FIGS. 6A and 6B also show the dimensional relationship between a face regulating probe and a current detection probe.

More specifically, a face regulating probe 601 is about 50 $\mu$m long and its tip has a height of 10 $\mu$m, whereas a current detection probe 602 is 30 $\mu$m long and its tip has a height of 7 $\mu$m. The both probes have a thickness of 2 $\mu$m. The difference 3 $\mu$m is provided in the height to produce a lag from the time when the tip of the face regulating probe touches the recording medium to the time when that of the current detection probe touches the medium. As the probes are moved closer to the recording medium in the direction indicated by arrows in FIG. 6A, they eventually get into contact with the latter in a manner as shown in FIG. 6B.

In an experiment, a probe substrate as described above was used for a face regulating operation. The recording medium substrate comprised an Si substrate and an Au thin film formed on it by evaporation.

A stepping motor was used for the initial approach (coarse motion), monitoring the motion visually. Then, actuators (A, B and C which are laminate type piezoelectric units) were used for fine regulating motion.

Figure 4:
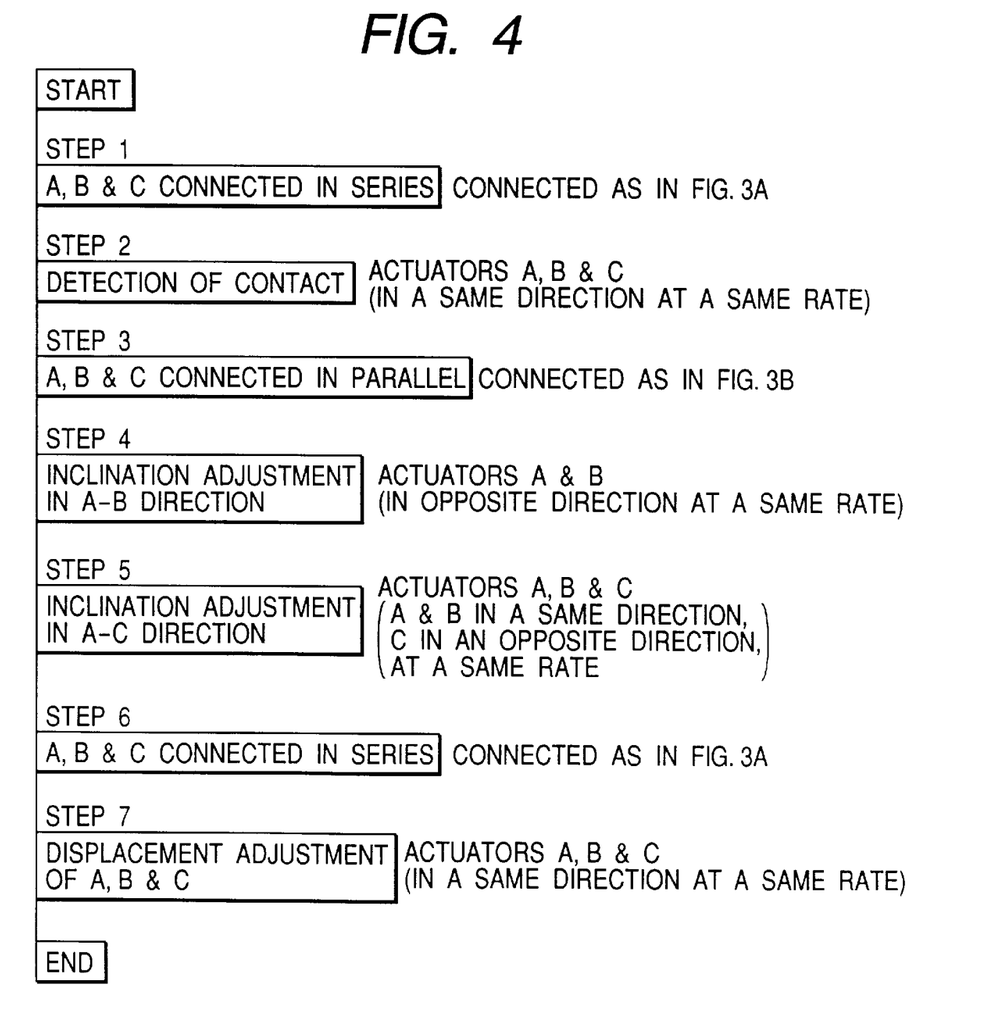
FIG. 4 is a flow chart of a face regulating operation of the first embodiment.

After the completion of the face regulating operation, the actuators A, B and C were moved slowly to carry out Step 7 in FIG. 4, while applying a voltage of 0.1 V to the recording medium to observe the electric current flowing through the current detection probes. An electric current was detected in all the probes with a variance less than 500 nm. The variance of 500 nm substantially corresponds to the undulations on the surface plane of the probe substrate and that of the recording medium substrate so that it was proved that the face regulating operation was performed with that level of accuracy.

(Information Recording/Reproducing Operation)

In an experiment, an information recording/reproducing operation was conducted, using a probe substrate as described above.

As recording medium, an organic ultra-thin film (LB film) comprising six monomolecular layers of an organic compound having a conjugated $\pi$ electron system as described in Japanese Patent Application Laid-Open No. 63-161552 or No. 63-161553 was formed by means of the Langmuir-Blodgett's technique.

For the recording phase of operation, a pulse voltage was applied sequentially on current detection probes as described above.

A circuit as shown in FIG. 7 was used. Referring to FIG. 7, unlike the above-described experiment, not the R terminal but the W terminal was used to apply a pulse on each of the probes at an appropriate timing. A triangular pulse voltage having a wave height of 3 V was applied for recording.

For the reproducing phase of operation, a 2 V DC bias voltage was applied to the substrate and the probes were connected to the R terminal to observe the electric current flowing therethrough.

Although not illustrated, the recording medium was provided with a scanning system for scanning along a plane parallel to the surface of the recording medium so that bits could be recorded respectively at desired locations on the recording medium as the latter is being scanned.

When the bits obtained by all the probes were observed in terms of the current values as an image resembling that of the STM, while scanning the recording medium, the shape and the size of the bits were found invariable throughout the probes and no bits were detected for the unreproduced areas.

Generally, when the probes are pressed against the recording medium under a relatively large pressure, the contact area of the tip of each probe increases to enlarge the bit. Variations in the shape and size of bit can adversely affect the error rate for the reproducing operation and hence are not desirable.

The result obtained in this experiment showed that all the probes are held in contact with the recording surface of the recording medium and no excessive pressure was applied to any of the probes.

Hence it was proved by the result that an recording/reproducing operation can be conducted stably and reliably by using a plurality of probes arranged two-dimensionally and scanning the recording medium according to the invention while maintaining the surface plane of the recording medium and that of the probe substrate in parallel with each other.

[Second Embodiment]

Capacitive sensors are used for this embodiment to measure the distance between the surface plane of the recording medium and that of the probe substrate.

Figure 8A:
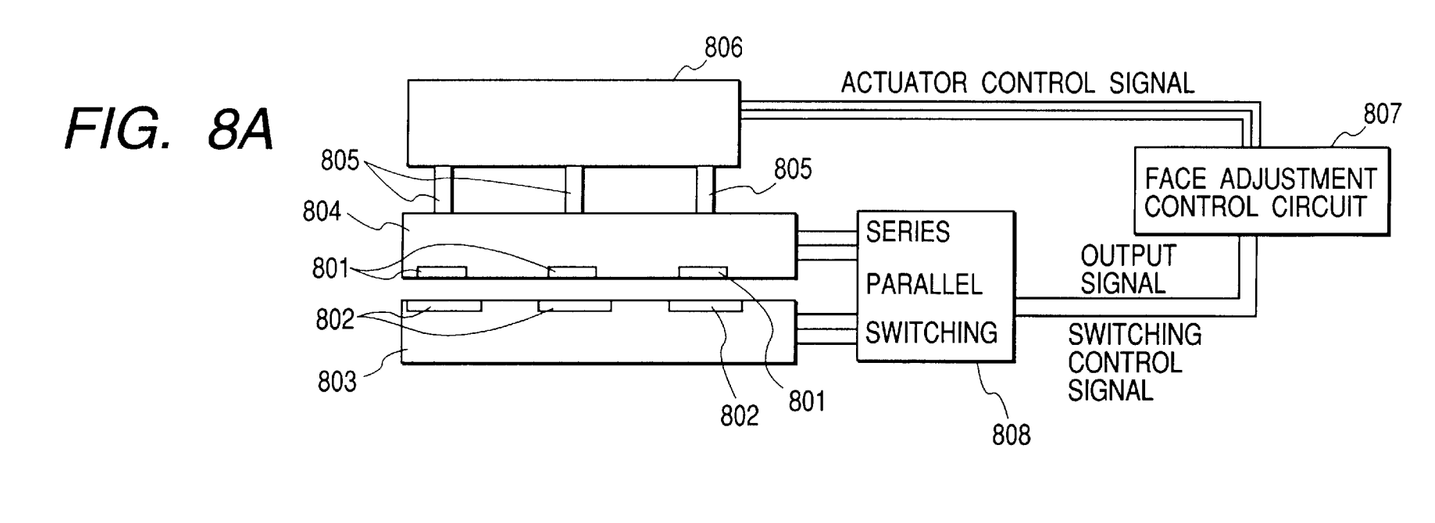
FIGS. 8A and 8B schematically illustrate the configuration of a second embodiment of face regulating system according to the invention.
Figure 8B:
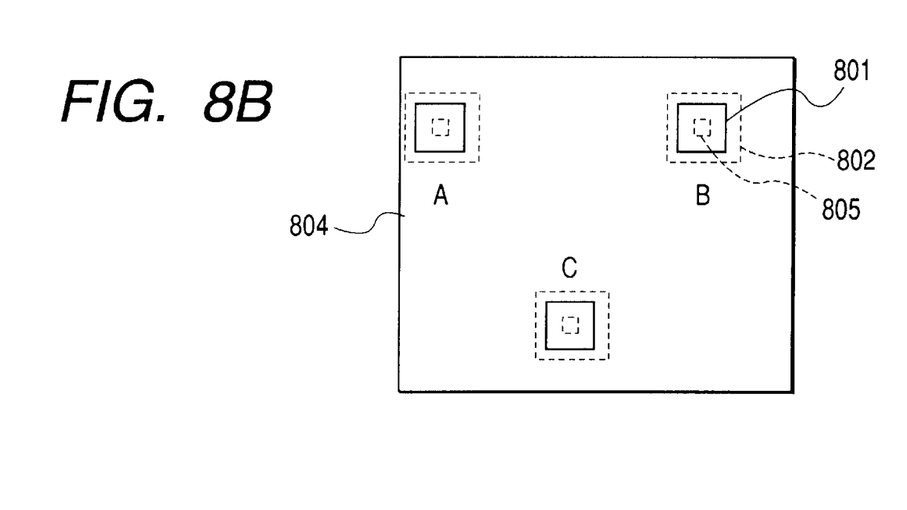

FIGS. 8A and 8B schematically illustrate the configuration of this second embodiment of face regulating system according to the invention. Referring to FIG. 8A that shows a schematic lateral view, a probe substrate 804 is disposed opposite to a medium substrate 803 and displacement detecting plate electrodes 801 and 802 are arranged as electrostatic capacitance sensors on the respective substrates and adapted to measure the distance between the substrates by way of the change in the existing electrostatic capacitance.

The probe substrate 804 is driven to move perpendicularly relative to the surface plane of the recording medium by three actuators 805. Reference numeral 806 denotes an actuator drive unit that also provides a support to the actuators. The actuator drive unit 806 drives the actuators according to the control signal that a face adjustment control circuit 807 provides on the basis of the electrostatic capacitances indicated by the output signals of the plate electrodes. The electrostatic capacitance detected by each plate electrode changes as serial/parallel switch unit 808 operates according to the switching control signal output by the face adjustment control circuit 807 in a manner as will be described hereinafter.

FIG. 8B is a schematic view of the probe substrate 804 as seen from below. Note that the plate electrodes are not arranged on a single straight line so that they may define a plane. The inner, dotted squares in FIG. 3B show the locations of the actuators 805 (which will be referred to as actuator A, actuator B and actuator C to show the correspondence to the respective plate electrodes), while the outer, dotted squares indicate the plate electrodes 802 on the medium substrate 803.

Now, the operation of the second embodiment will be described by referring to FIGS. 9A, 9B and 10.

Figure 9A:
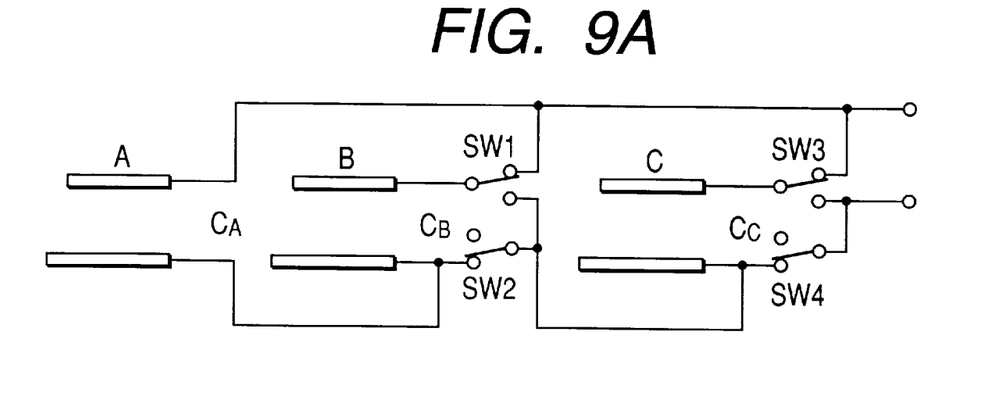
FIGS. 9A and 9B are circuit diagrams of the circuit for connecting the plate electrodes of the second embodiment.

As shown in FIG. 9A, a total of four analog switches SW1 through SW4 are arranged in the serial/parallel switch unit 808 to select the capacitance of each of the plate electrodes. In this embodiment, a mechanical relay switching circuit is arranged. The switches are then turned on/off according to the switching control signal sent from the face adjustment control circuit 807.

Basically, the distance d between each pair of oppositely disposed electrodes and the detected capacitance C shows a relationship of $C=\epsilon_r{}^*\epsilon_0{}^*S/d$ (where $\epsilon_0$ is the permittivity of vacuum and $\epsilon_r$ is the relative permittivity of air) so that each capacitance sensor can determine the distance between the electrodes by using the detected capacitance C if the effective surface area S of the electrodes is known.

Assume here that the capacitance increases by $\Delta C$ when the inter-electrode distance is reduced by $\Delta d$. Thus, $C=C_0+\Delta C$ where $C_0$ is the capacitance in the initial state. The plate electrodes A and B in FIG. 8B will be used in the following description. In the initial state, the capacitances of the electrodes are $C_{A0}$ and $C_{B0}$ respectively. When the probe substrate and the medium substrate are brought closer relative to each other, then $C_A=C_{A0}+\Delta C_A$ and $C_B=C_{B0}+\Delta C_B$, where $\Delta C_A=\Delta d/(d_{A0}{}^2+\Delta d^*d_{A0})$ and $\Delta C_B=\Delta d/(d_{B0}{}^2+\Delta d^*d_{B0})$. When the two substrates are held in parallel with each other, the inter-electrode distance is equal for both the probes A and B and the they show a same and equal capacitance. Then, $C_{A0}$ and $C_{B0}$ are connected in series (to produce a capacitance of $C_0$) and the actuators A and B for the respective plate electrodes are driven to move the electrodes a same rate in opposite directions until a maximal value is obtained for $C_0$. Since $C_0{}^{-1}=C_A{}^{-1}+C_B{}^{-1}=(C_{A0}+\Delta C_A)^{-1}+(C_{B0}+\Delta C_B)^{-1}$, $C_A=C_B$ when $C_0$ shows a maximal value. Thus, the recording medium plane and the line connecting the two probes A and B are in parallel with each other.

Figure 9B:
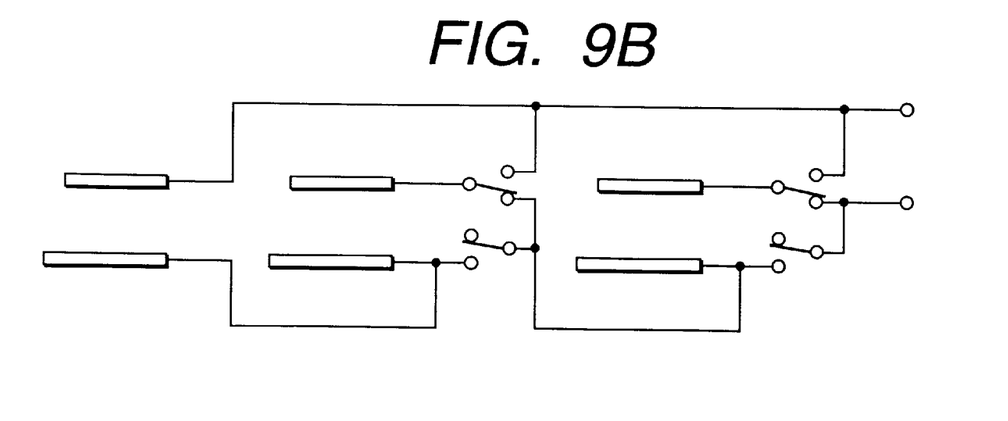

Thus, according to the invention, the surface plane of the recording medium and that of the probe substrate can be parallelized in a simple manner by means of three plate electrodes and a switching circuit as shown in FIGS. 9A and 9B.

In FIG. 9A, the plate electrodes are connected in parallel whereas FIG. 9B shows the plate electrodes connected in series. According to the invention, a face regulating operation proceeds by controlling the connections of SW1 through SW4 in a manner as illustrated in FIG. 10.

To begin with, the plate electrodes are connected in series (Step 1) and the actuators A, B and C are driven to move the probe substrate closer to the recording medium substrate (Step 2).

While the actuators are laminate type piezoelectric units in this embodiment, they may be replaced by those having a relatively large dynamic range such as stepping motors. The capacitance detection starts when the distance between the two substrates is reduced to a certain value, which may vary depending on the size of the electrodes. When a capacitance is detected for the plate electrodes connected in series, it indicates that all the probes are found within a detectable range.

Then, a maximal value will be detected for the capacitance being observed by moving the actuators A and B in opposite directions at a same rate, holding the actuator C stationarily while the probes are still connected in series as shown in FIG. 9B (Step 3).

Then, the actuators A and B are driven in a same direction and the actuator C is driven in the opposite direction at a same rate, keeping the electric connection unchanged (FIG. 9B), to find out a maximal value for the capacitance (Step 4). The surface plane of the probe substrate and that of the recording medium substrate are held in parallel when the above operation is over. Then, the probes A, B and C are connected in parallel (FIG. 9A) and all the actuators are moved in a same direction at a same rate to obtain a selected displacement for all the probes relative to the surface plane of the recording medium (Step 6).

With the above described technique, a simplified detecting system can be realized because just a single operation is needed, in contrast with independent monitoring of each pair of plate electrodes, to monitor and compare the capacitances of the plate electrodes.

Figure 11:
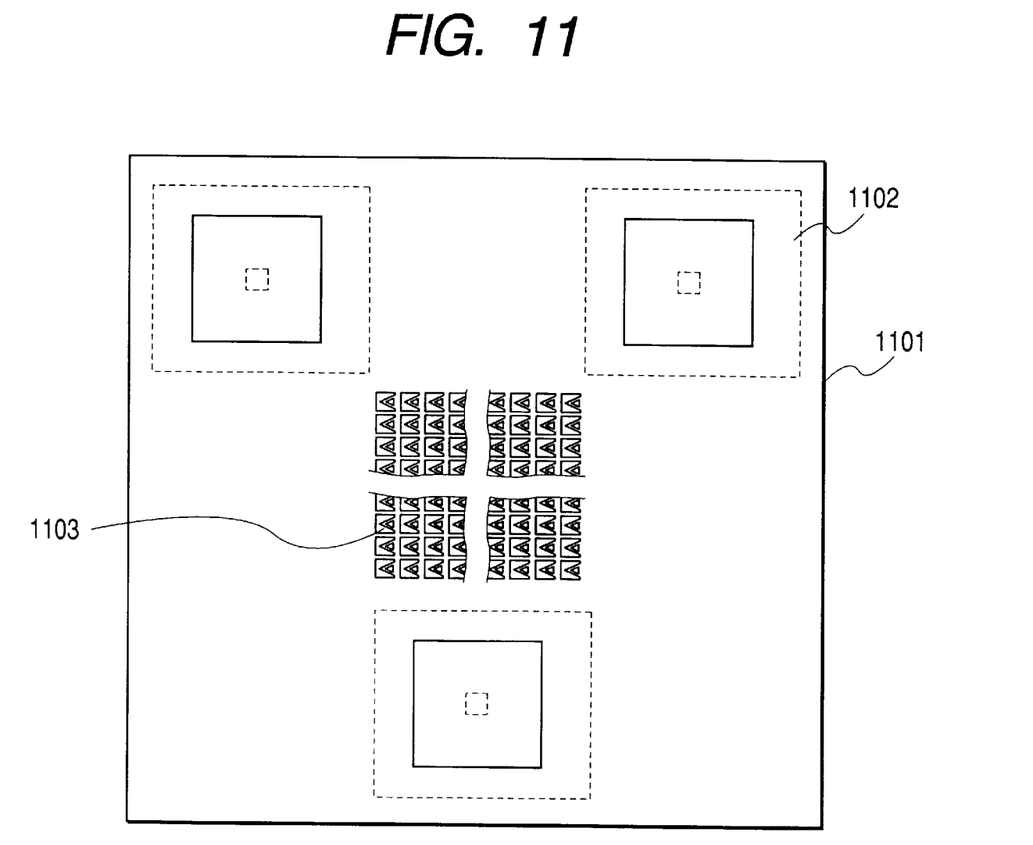
FIG. 11 is a schematic plan view of a recording/reproducing probe substrate that can be used for the second embodiment.
Figure 12A:
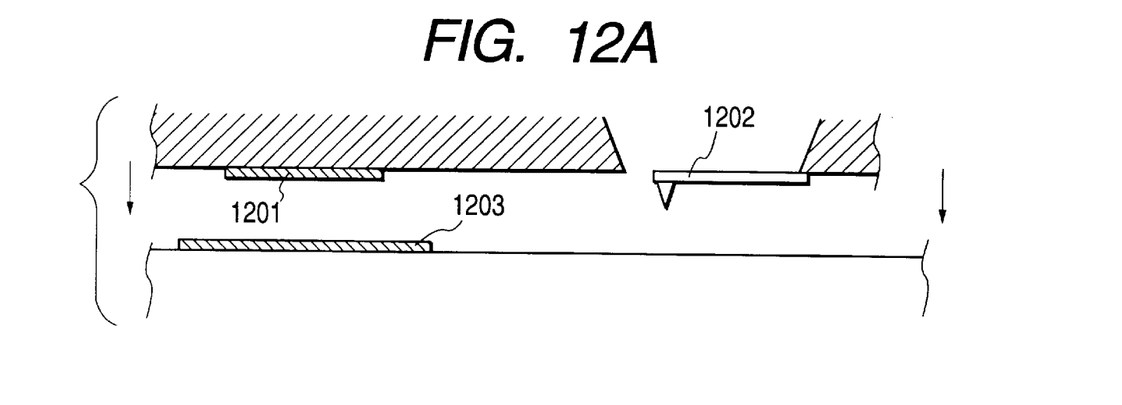
FIGS. 12A and 12B schematically illustrate the positional relationship between one of the plate electrodes of the second embodiment and a corresponding current detection probe under two different conditions.
Figure 12B:
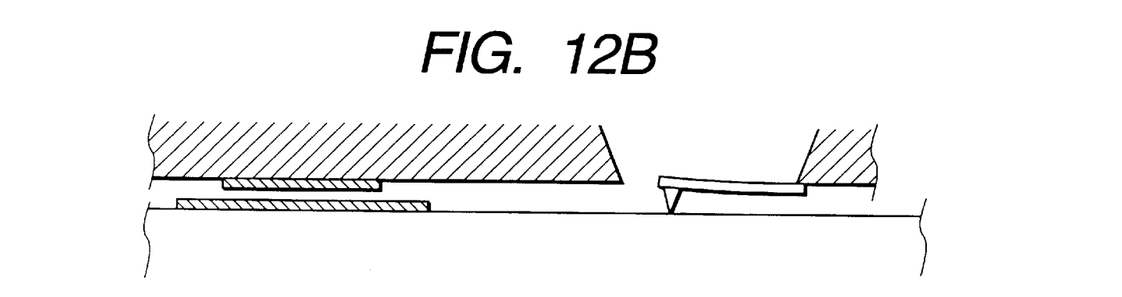

In an experiment, a 5.5 mm☐ probe substrate as schematically shown in FIG. 11 was prepared to see that the face regulating operation can be conducted reliably and accurately with the above described technique. Referring to FIG. 11, the probe substrate 1101 carries thereon a total of three face regulating plate electrodes 1102 along with a total of 400 (20×20) current detection micro-probes 1103 arranged at regular intervals. The micro-probes took an area of 2 mm☐ on the probe substrate. FIG. 12A schematically shows a lateral view of one of the plate electrodes and a corresponding current detection probe, which is identical with those used in Embodiment 1. FIG. 12A also shows the dimensional relationship between a plate electrode and a current detection probe. More specifically, the face regulating plate electrode 1201 has a surface area of 1 mm$^2$ and a height of 2 $\mu$m and is produced by vacuum evaporation and the face regulating plate electrode 1203 has a surface area of 3 mm$^2$ and a height of 2 $\mu$m and is produced also by vacuum evaporation, whereas the current detection probe 1202 is 30 µm long and its tip has a height of 7 µm. The electrostatic capacitance of each sensor is about 3 pF at the instance when the current detection probe gets in touch with the medium substrate. As the substrates are moved closer to each other as indicated by arrows in FIG. 12A, the probes eventually get into contact with the medium substrate in a manner as shown in FIG. 12B.

In an experiment, a probe substrate as described above was used for a face regulating operation. The recording medium substrate comprised an Si substrate and an Au thin film formed to a thickness of 100 angstroms on it by evaporation.

A stepping motor was used for the initial approach (coarse motion), monitoring the motion visually. Then, actuators (A, B and C which are laminate type piezoelectric units) were used for fine regulating motion.

Figure 10:
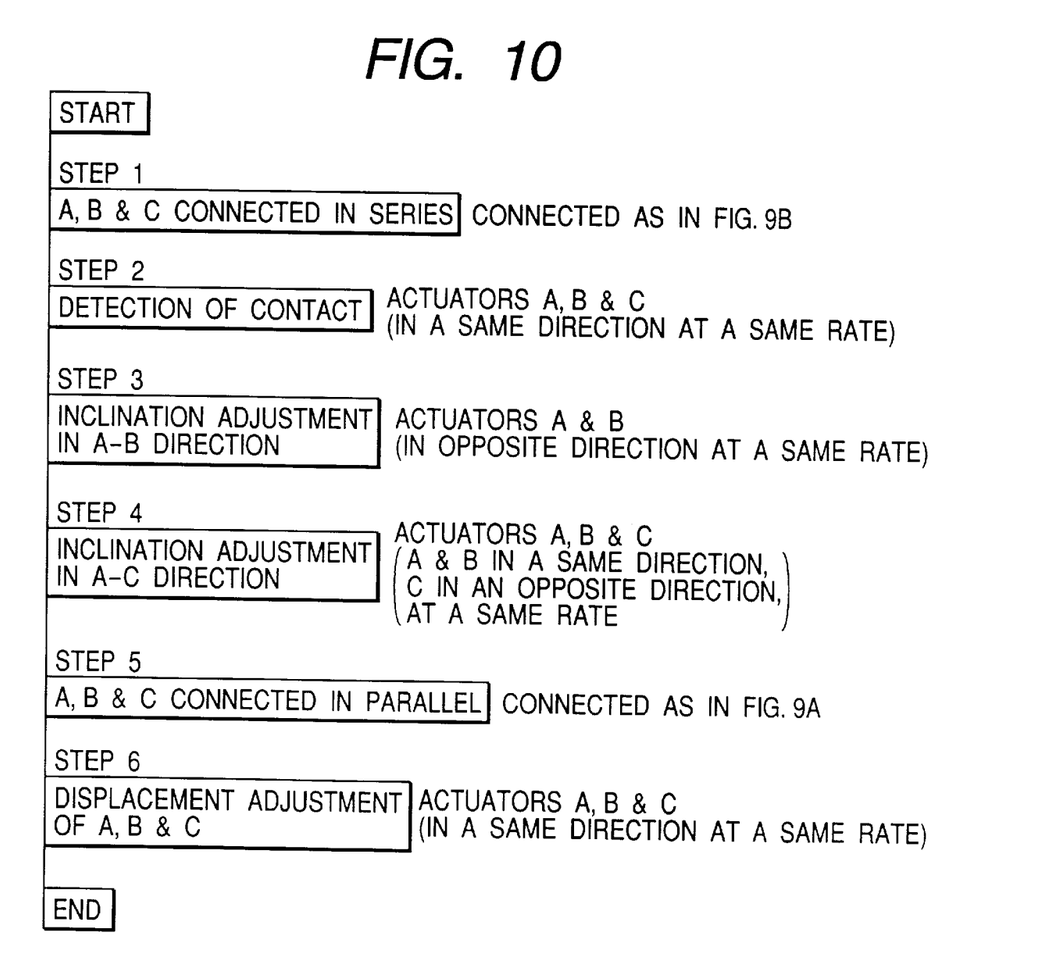
FIG. 10 is a flow chart of a face regulating operation of the second embodiment.

After the completion of the face regulating operation, the actuators A, B and C were moved slowly to carry out Step 6 in FIG. 10, while applying a voltage of 0.1 V to the recording medium to observe the electric current flowing through the current detection probes. An electric current was detected in all the probes with a variance less than 500 nm. The variance of 500 nm substantially corresponds to the undulations on the surface plane of the probe substrate and that of the recording medium substrate so that it was proved that the face regulating operation was performed with that level of accuracy.

(Information Recording/Reproducing Operation)

In an experiment, an information recording/reproducing operation was conducted, using a probe substrate as described above by referring to the third embodiment.

As recording medium, an organic ultra-thin film (LB film) comprising six monomolecular layers of an organic compound having a conjugated π electron system as described in Japanese Patent Application Laid-Open No. 63-161552 or No. 63-161553 was formed by means of the Langmuir-Blodgett's technique. The medium was prepared by forming an Au thin film on an Si substrate as described above. For the recording phase of operation, a pulse voltage was applied sequentially on current detection probes also described above. A circuit as shown in FIG. 7 was used as in the case of the first embodiment. Referring to FIG. 7, unlike the above-described experiment however, not the R terminal but the W terminal was used to apply a pulse on each of the probes at an appropriate timing. A triangular pulse voltage having a wave height of 3 V was applied for recording. For the reproducing phase of operation, a 2 V DC bias voltage was applied to the substrate and the probes were connected to the R terminal to observe the electric current flowing therethrough. Although not illustrated, the recording medium was provided with a scanning system for scanning along a plane parallel to the surface of the recording medium so that bits could be recorded respectively at desired locations on the recording medium as the latter is being scanned.

When the bits obtained by all the probes were observed in terms of the current values as an image resembling that of the STM, while scanning the recording medium in opposite directions with a width of 1 µm, the shape and the size of the bits were found invariable throughout the probes and no bits were detected for the unreproduced areas. Generally, when the probes are pressed against the recording medium under a relatively large pressure, the contact area of the tip of each probe increases to enlarge the bit. Variations in the shape and size of bit can adversely affect the error rate for the reproducing operation and hence are not desirable. The result obtained in this experiment showed that all the probes are held in contact with the recording surface of the recording medium and no excessive pressure was applied to any of the probes.

Hence it was proved by the result that an recording/reproducing operation can be conducted stably and reliably by using a plurality of probes arranged two-dimensionally and scanning the recording medium according to the invention while maintaining the surface plane of the recording medium and that of the probe substrate in parallel with each other.

What is claimed is:

1. An information processing apparatus for recording/reproducing information on a recording medium by means of probes comprising:

a substrate carrying thereon a plurality of probes arranged two-dimensionally in a plane;

at least three sensors at three different points on said substrate for detecting the distance between the substrate and the recording medium;

a switching circuit for selecting a parallel connection or a serial connection for said sensors; and a regulating system for regulating the relative inclination and the distance between said probe plane and said recording medium surface plane according to the output of the sensors connected in series and that of the sensors connected in parallel.

2. An information processing apparatus according to claim 1, wherein said sensors are piezoresistors and arranged on respective cantilevers.

3. An information processing apparatus according to claim 2, wherein said regulating system regulates the relative inclination of the surface plane of said probe substrate and the surface plane of said recording medium according to the resistance of said piezoresistors connected in parallel and the distance between the surface plane of said probe substrate and the surface plane of said recording medium according to the resistance of said piezoresistors connected in series.

4. An information processing apparatus according to claim 1, wherein said sensors are electrostatic capacitance sensors.

5. An information processing apparatus according to claim 4, wherein said regulating system regulates the relative inclination of the surface plane of said probe substrate and the surface plane of said recording medium according to the capacitance of said electrostatic capacitance sensors connected in parallel and the distance between the surface plane of said probe substrate and the surface plane of said recording medium according to the capacitance of said electrostatic capacitance sensors connected in series.

\* \* \* \* \*

UNITED STATES PATENT AND TRADEMARK OFFICE
CERTIFICATE OF CORRECTION

PATENT NO. : 6,072,764
DATED : June 6, 2000
INVENTOR(S) : Shunichi Shido, et al.

It is certified that error appears in the above-identified patent and that said Letters Patent is hereby corrected as shown below:

COLUMN 1:
Line 27, "form" should read --form of--.

COLUMN 6:
Line 60, "an" should read --a--.

COLUMN 10
Line 11, "an" should read --a--.

Signed and Sealed this

Twelfth Day of June, 2001

*Attest:*

*Attesting Officer*

NICHOLAS P. GODICI
*Acting Director of the United States Patent and Trademark Office*